United States Patent Office 3,743,498
Patented July 3, 1973

3,743,498
METHOD OF SELECTIVELY CONTROLLING UNDESIRABLE VEGETATION
Richard Kirven Brantley, Wilmington, Del, assignor to E. I. du Pont de Nemours and Company, Wilmington, Del.
No Drawing. Original application Oct. 31, 1967, Ser. No. 679,565, now Patent No. 3,547,940, dated Dec. 15, 1970. Divided and this application Aug. 14, 1970, Ser. No. 63,923.
Int. Cl. A01n 9/00
U.S. Cl. 71—88   12 Claims

ABSTRACT OF THE DISCLOSURE

Disclosed is a method of selectively controlling unwanted vegetation wherein an herbicidal composition comprising certain substituted ureidoisoxazole is applied to the locus of the vegetation, either pre-emergence or post-emergence.

CROSS-REFERENCE TO A RELATED APPLICATION

This application is a division of application Ser. No. 679,565, filed Oct. 31, 1967, now U.S. Pat. No. 3,547,940.

BACKGROUND OF THE INVENTION

Field of the invention

This invention relates to the use of certain substituted ureidoisoxazoles as herbicides.

Prior art

The parent application, Ser. No. 679,565, now U.S. Pat. No. 3,547,940 discloses a new class of chemical compounds, substituted ureidoisoxazoles having the following Formula 1

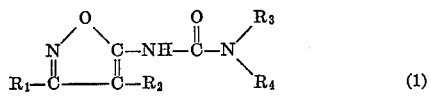   (1)

in which $R_1$ is methyl or ethyl;
$R_2$ is hydrogen, chlorine, bromine or methyl;
$R_3$ is hydrogen or alkyl of 1 through 3 carbon atoms and;
$R_4$ is alkyl of 1 through 3 carbon atoms; unsubstituted cyclohexyl, cyclohexyl substituted with chlorine or methyl, or

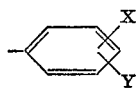

in which
  X is hydrogen, fluorine, chlorine, chromine or methyl; and
  Y is hydrogen, chlorine or $NO_2$;

with the proviso that when $R_4$ is aryl, $R_3$ must be hydrogen, and to the use of these compounds in controlling unwanted vegetation in turf, crops and nursery stock.

These new compounds are said to be useful as herbicides.

SUMMARY OF THE INVENTION

Substituted ureidoisoxazoles having the Formula 1 are effective in controlling chickweed *Stellaria media* and other grassy and broadleaved weeds without injury to such desirable vegetation as crops, nursing stock, and turf. These herbicides can be applied either pre-emergence or post-emergence.

DETAILED DESCRIPTION OF THE INVENTION

Compounds having the Formula 1 will control such representative weeds as, for instance, mustard Brassica spp., ragweed *Ambrosia elation*, teaweed Sida spp., velvetleaf *Abutilon theophrasti*, pigweed *Amaranthus retroflexus*, and yellow rocket *Barbarea vulgaris*. Some compounds of this invention are also effective in controlling goosegrass *Eluesine indica*, foxtail Setaria spp., and Johnson grass *Sorghum halepense*, growing from seed.

The preparation of substituted ureidoisoxazoles of Formula 1 has been described in detail in the parent application. They can be made, among others, by a reaction of a 5-aminoisoxazole with an isocyanate or a carbamoyl halide; or by a two-step reaction starting with a suitable 5-aminoisoxazole, via isoxazole isocyanate which then is contacted with a suitable amine. Such reactions can be readily understood and carried out by those skilled in chemistry.

FORMULATION

Herbicidal formulations useful in the process of this invention can be prepared by admixing at least one compound of Formula 1 with pest control adjuvants or modifiers to provide compositions in the form of dusts, granules, pellets, wettable dispersible powders, high-strength concentrates, aqueous dispersions or emulsions and solutions or dispersions in organic liquids.

(A) Wettable powders

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the compounds of Formula 1 are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed by J. W. McCutcheon in "Detergents and Emulsifiers," Annual. Among the more preferred surfactants are the nonionic and anionic type, and those most suitable for the preparation of the dry, wettable products of this invention are solid forms of compounds known to the art as wetters and dispersants. Occasionally a liquid nonionic compound classified primarily as an emulsifier may serve as both wetter and dispersant.

Most preferred wetting agents are alkylbenzene and alkylnaphthalene sulfonates, sulfated fatty alcohols, amines or acid amides, long chain acid esters of sodium isethionate, sodium sulfosuccinate esters, sulfated or sulfonated fatty acid esters, petroleum sulfonates, sulfonated vegetable oils, and dietary acetylenic glycols. Preferred dispersants are methyl cellulose, polyvinyl alcohol, lignin sulfonates, polymeric alkylnaphthalene sulfonates, sodium naphthalenesulfonate, polymethylene bisnaphthalenesulfonate, and sodium - N - methyl-N-(long chain acid) taurates.

Wetting and dispersing agents in these preferred wettable powder compositions of this invention are usually present at concentrations of about 0.5 weight percent to 5 weight percent. The inert extender then completes the formulation. Where needed, 0.1 weight percent to 1.0 weight percent of the extender may be replaced by a corrosion inhibitor or an antifoaming agent or both.

Thus, wettable powder formulations of the invention will contain about 25 to 90 weight percent active material, 0.5 to 2.0 weight percent wetting agent, 0.25 to 5.0 weight percent dispersant, and 9.25 to 74.25 weight percent inert extender, as these terms are described above.

When the wettable powder contains a corrosion inhibitor or an antifoaming agent or both, the corrosion inhibitor will not exceed about 1 percent of the composition, and the antifoaming agent will not exceed about 0.5 percent by weight of the composition, both replacing equivalent amounts of the inert extender.

(B) High strength compositions and aqueous suspensions concentrates

High-strength compositions generally consist of 90 to 99.5% active ingredient and 0.5 to 10% of a liquid or solid surfactant such as those described by McCutcheon in "Detergents and Emulsifiers" Annual. Such high-strength compositions can often be used in a manner similar to the wettable powders but they are also suitable for further formulation.

The aqueous suspension concentrates are prepared by mixing together and sandgrinding an aqueous slurry of water-insoluble active ingredient in the presence of dispersing agents. Thus, there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 40% of active ingredient, from 45 to 70% water with the remainder made up of surfactants, corrosion inhibitors, and suspending agents.

Suspensions in organic liquids can be prepared in a similar manner such as by replacing the water with mineral oil.

(C) Dusts

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin; the wetting agent is preferably anionic or nonionic; and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid absorption. Suitable classes of grinding aids are natural clays, diatomaceous earths, and synthetic mineral fillers derived from silica or silicate. Both ionic and nonionic wetting agents are suitable, especially the members of the group known to the art as emulsifiers. Although solid agents are preferred because of ease in incorporation, some liquid nonionic agents are also suitable in the dust formulations.

Preferred inert solid extenders for the dusts of this invention are micaceous talcs, pyrophyllite, dense kaolin clays, tobacco dust and ground calcium phosphate rock such as that known as "Phosphodust" (a trademark of the American Agricultural Chemical Company).

Preferred grinding aids are attapulgite clay, diatomaceous silica, synthetic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agents, corrosion inhibitors, and antifoam agents may also be found as components of a dust.

Except for these additives, the dust compositions of this invention will comprise about 5 to 20 weight percent active material, 5 to 50 weight percent absorptive filler, 0 to 1.0 weight percent wetting agent, and about 30 to 90 weight percent dense, free-flowing dust diluent, as these terms are used herein.

(D) Emulsifiable oils

Emulsifiable oils are usually solutions of active material in water-immiscible solvents together with a surfactant.

For the compounds of this invention, emulsifiable oils can be made by mixing the active ingredient with a solvent and surfactant. Suitable solvents for the compounds of this invention are aromatic hydrocarbons including many weed oils, chlorinated solvents, and water-immiscible ethers, esters, or ketones. Suitable surfactants are those anionic or nonionic agents known to the art as emulsifying agents. Such compounds can be found listed in "Detergents and Emulsifiers," Annual, by John W. McCutcheon, Inc.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty acid esters, polyethylene glycol esters with fatty or rosin acids, fatty alkylolamide condensates, calcium and amine salts of fatty alcohol sulfates, oil soluble petroleum sulfonates or, preferably, mixtures of these emulsifying agents. Such emulsifying agents will comprise from about 1 to 10 weight percent of the total composition. As described above, however, up to 5 parts of emulsifying agent for each part of the ureidoisoxazole can be used.

Thus, emulsifiable oil compositions of the present invention will consist of from about 15 to 50 weight percent active material, about 40 to 82 weight percent solvent, and about 1 to 10 weight percent emulsifier, as these terms are defined and used above.

In some instances the oil solution may be intended merely for extension with other oils, such as weed oils. In this instance the emulsifying agents may be omitted and may be replaced by additional solvent.

(E) Granules and pellets

Granules and pellets are physically stable, particulate compositions containing a compound of Formula 1 which adheres to or is distributed through a basic matrix of a coherent, inert carrier with macroscopic dimensions. In order to aid leaching of the active ingredient from the granule or pellet, a surfactant can be present.

For the compounds of this invention, the inert carrier is preferably of mineral origin, and the surfactant is a compound known to the art as a wetting agent. Such compounds are listed by J. W. McCutcheon in "Detergents and Emulsifiers," Annual.

Suitable carriers are natural clays, some pyrophyllites, vermiculite, and granular fertilizers. Suitable wetting agents are anionic or nonionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight percent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent active component but more frequently a concentration of about 10 weight percent is desired for optimum distribution. The granular compositions of this invention are most useful in a size range of 15–30 mesh.

The most suitable wetting agents for the granular compositions of this invention depend upon the type of granule used. When preformed granules are sprayed with active material in liquid form the most suitable wetting agents are nonionic, liquid wetters miscible with the solvent. These are compounds more generally known to the art as emulsifiers, and comprise alkylaryl polyether alcohols, alkyl polyether alcohols, polyoxyethylene sorbitan fatty acid esters, polyethylene glycol esters with fatty or rosin acids, fatty alkylolamide condensates, oil soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid nonionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 5 to 30 weight percent active material, about 0 to 5 weight percent wetting agent, and about 65 to 95 weight percent inert mineral carrier, as these terms are used herein.

In addition to the surface active agents, extenders, diluents, carriers, solvents, grinding aids, antifoaming agents, corrosion inhibitors, modifiers and dispersing agents discussed above, the compounds of Formula 1 can often also be mixed with desiccants, buffering agents, bactericides, fungicides, insecticides, nematocides, acaricides, bacteriostats, fungistats, fertilizers, and other herbicides.

Particularly useful combinations are mixtures of one or more compounds of Formula 1 with α,α,α-trifluoro-2,6-dinitro-N,N-dipropyl-p-toluidine;
dimethyl-2,3,5,6-tetrachloroterephthalate;
2-chloro-N-isopropyl acetanilide;
N-(2-mercaptoethyl)benzenesulfonamide;
2,4-dichlorophenoxyacetic acid; and
1-(2-methylcyclohexyl)-3-phenylurea, for use in controlling a wide range of undesirable vegetation.

APPLICATION

The compounds of Formula 1 can be applied by any of the many means well known to the art. Ordinarily the compounds will be applied in the form of a wettable powder or solution formulation as described above. The active ingredient is applied in a sufficient concentration and amount to exert the desired herbicidal activity. Application can be made directly upon the area to be protected and the vegetation during the period of infestation by post- or pre-emergence techniques.

The rates of application will of course vary depending upon the particular active ingredient employed, the nature of the formulation used, the type of treatment, the type of vegetation to be controlled and protected, the time of the year, the climate and the like. In general, the compounds of Formula 1 are applied at rates ranging from 1 to 20 kilograms per hectare.

This invention is now illustrated by representative examples of certain preferred embodiments thereof, wherein all parts, proportions, and percentages are by weight, unless otherwise specified.

EXAMPLE 1

| | |
|---|---|
| 4-bromo-3-methyl-5-(3-phenylureido)isoxazole | 50.0 |
| Kaolinite | 46.0 |
| Partially desulfonated sodium ligninsulfonate | 2.0 |
| Dioctyl sodium sulfosuccinate | 2.0 |

The above ingredients are blended, micropulverized to a particle size below 100 microns, and reblended.

The above composition is diluted with water at the rate of one kilogram of active ingredient per 1600 liters of water and is thoroughly agitated. The resultant spray suspension is evenly distributed over a 1 hectare plot of freshly seeded Kentucky bluegrass, Poa pratensis. The treatment results in excellent control of chickweed, Stellaria media, enabling the bluegrass to grow to a thick stand.

Four kilograms of the above formulation and eight kilograms of a 50% wettable powder formulation of 1-(2-methylcyclohexyl)-3-phenylurea are suspended in 250 liters of water and sprayed pre-emergence over .4 hectare of newly seeded Kentucky bluegrass. This treatment gives control of chickweed; crabgrass, Digitaria spp.; foxtail, Setaria spp. and barnyardgrass, Echinochloa crusgalli. The bluegrass germinates and rapidly develops into a thick stand.

Other compounds of Formula 1, such as 4-chloro-3-methyl-5-(3-phenylureido)isoxazole and 4-bromo-3-methyl-5-[3-(p-chlorophenyl)ureido]isoxazole, can be formulated and applied in the manner described above with similar results.

EXAMPLE 2

| | Percent |
|---|---|
| 3-methyl-5-(3-phenylureido)isoxazole | 25.0 |
| Attapulgite clay | 72.5 |
| Dioctyl sodium sulfosuccinate | 1.0 |
| Sodium lignin sulfonate | 1.5 |

The above ingredients are blended, ground to a particle size essentially below 50 microns, and reblended.

Thirty-two kilograms of the above composition, uniformly suspended in 300 liters of water, are applied pre-emergence to a newly planted hectare of soybeans. This treatment provides excellent control of red-root pigweed, Amaranthus retroflexus, without casing visible injury to the soybean crop.

All of the compounds of the invention—particularly 4-bromo-5-[3-(m-tolyl)ureido] - 3 - methylisoxazole, 4-chloro-5-(3,3-dimethylureido)-3-methylisoxazole, and 4-bromo-5-(3,3-dipropylureido)-3-methylisoxazole—can be formulated in like manner.

EXAMPLE 3

| | Percent |
|---|---|
| 4 - bromo-5-[3-(p-chlorophenyl)ureido] - 3 - methylisoxazole | 99 |
| Trimethylnonyl polyethylene glycol ether | 1 |

The surfactant is sprayed on the active ingredient which is tumbled in a blender. The resulting high-strength composition is ground to pass a 0.59 mm. screen. It is suitable for further formulation but can also be applied directly.

The composition described above when applied by helicopter at the rate of 20 kilograms per hectare to a field of recently planted cotton results in complete control of the teaweed, Sida spp., and has no apparent adverse effect on the crop.

4 - bromo-5-[3-(p-bromophenyl)ureido] - 3 - methylisoxazole can be substituted for the 4-bromo-5-[3-p-chlorophenyl)ureido]-3-methylisoxazole in the above example with similar results.

EXAMPLE 4

| | Percent |
|---|---|
| 4 - bromo-5-[3-(o-fluorophenyl)ureido] - 3 - methisoxazole | 30.0 |
| Calcium-magnesium lignin sulfonate plus wood sugars | 15.0 |
| Hydrated attapulgite | 2.0 |
| Sodium carbonate | 1.0 |
| Dioctyl sodium sulfosuccinate | 0.5 |
| Water | 51.5 |

The above solid ingredients are ground to pass a 0.84 mm. screen. The water is then added, and the composition is sand-ground to a particle size below 5 microns. The suspension obtained by adding the sand-ground composition to water can be applied with little or no agitation.

The above sand-ground composition is extended with water at the rate of 5 kilograms of active ingredient per 250 liters of water. The resulting suspension is applied pre-emergence to a one hectare plot of field corn. The treatment gives excellent control of velvetleaf, *Abutilon theophrasti*, without causing injury to the corn.

EXAMPLE 5

| | Percent |
|---|---|
| 4 - bromo - 3 - methyl-5-[3-(p-nitrophenyl)ureido] isoxazole | 5.0 |
| Attapulgite clay | 10.0 |
| Sodium benzene sulfonate | 0.5 |
| Talc | 84.5 |

All the above ingredients except the talc are blended and micropulverized to a particle size essentially below 50 microns. This concentrate is then blended thoroughly with the talc to produce the final dust composition.

The composition is applied pre-emergence at the rate of 250 kilograms per hectare to a field of Irish potatoes. Good control of chickweed is obtained and the potatoes are harvested in high yields.

4-bromo - 3 - methyl-5-[3-(3,4-dichlorophenyl)ureido] isoxazole can be substituted for the 4-bromo-3-methyl-5-[3-(p-nitrophenyl)ureido]isoxazole, and similar results are obtained.

EXAMPLE 6

| | Percent |
|---|---|
| 4 - bromo-5-(3-cyclohexyluredio) - 3 - methylisoxazole | 15.0 |
| Isophorone | 79.0 |
| Alkylphenyl polyethylene glycol ether | 3.0 |
| Oil soluble calcium alkylbenzene sulfonate | 3.0 |

The above ingredients are warmed with stirring to form an emulsifiable concentrate.

The concentrate is emulsified in water at the rate of 5 kilograms of active ingredient per 350 liters of water. The resultant emulsion is applied pre-emergence to a one-hectare evergreen nursery. Very satisfactory growth of the evergreens is obtained along with complete control of crabgrass and goosegrass, *Eluesine indica*, by means of the chemical treatment.

When formulated and applied in the same fashion, 5-[3-(4-chlorocyclohexyl)ureido] - 4 - chloro-3-methylisoxazole and 4-bromo-5-[3-(2-methylcyclohexyl)]-3-methylisoxazole give similar results.

EXAMPLE 7

| | Percent |
|---|---|
| 3-methyl-5-(3-methylureido)isoxazole | 10.0 |
| Kaolinite | 33.5 |
| Sub-bentonite | 33.5 |
| Sodium sulfate (anhyd.) | 10.0 |
| Calcium lignin sulfonate plus wood sugars | 12.0 |
| Sodium alkyl naphthalene sulfontae | 1.0 |

The above components are blended and micropulverized to a wettable powder with a particle size essentially below 100 microns. This powder is mixed with 18–20% water, is then extruded through a ⅛ inch die, is cut to size and the resulting pellets are then dried. The pellets can be applied directly or further sub-divided to granules.

The following compounds can be formulated in like manner to form herbicidal pellets.

4-bromo-3-methyl-5-(3-methyluredio)isoxazole.
3-ethyl-4-methyl-5-(3-phenylureido)isoxazole.
3-ethyl-4-methyl-5-(3-methylureido)isoxazole.
4-bromo-3-methyl-5-(3-phenylureido)isoxazole.
3-methyl-5-(3-phenylureido)isoxazole.

EXAMPLE 8

| | Percent |
|---|---|
| 3-methyl-5-(3-methylureido)isoxazole | 5.0 |
| Granular attapulgite (16–30 mesh) | 95.0 |

The active component is dissolved in methanol and the methanol solution is then sprayed on the granules which are tumbled in a mixer, followed by evaporation of the solvent.

The resulting granules are applied pre-emergence at the rate of 10 kilograms of active ingredient per hectare to a plot of field corn. This treatment provides complete control of crabgrass without injuring the crop.

EXAMPLE

| | Percent |
|---|---|
| 4 - bromo - 3 - methyl-5-[3-o-fluorophenyl)ureido] isoxazole | 80 |
| Montmorillonite clay | 15 |
| Finely-divided synthetic silica | 2 |
| Sodium alkyl naphthalene sulfonate | 2 |
| Sodium lignin sulfonate | 1 |

The above ingredients are blended, micropulverized to a particle size below 50 microns and reblended. Two kilograms of 4 - bromo-3-methyl-5-[3-(o-fluorophenyl)ureido]isoxazole, as formulated above, is suspended in 300 liters of water and sprayed on a hectare of tobacco land which has been freshly prepared and bedded ready for transplanting the crop. The plants are set by punching holes, dropping in the roots, and pressing the soil around them. In this manner the chemical layer on the soil surface is disturbed the least. Three days after planting, the tobacco is irrigated. The chemical treatment provides control of ragweed, *Ambrosia elation*, teaweed, goosegrass and pigweed, while the tobacco grows well.

EXAMPLE 10

A sufficient amount of the formulation of Example 9 to provide two kilograms of active ingredient are suspended in 200 liters of water and sprayed on a hectare of direct seeded tomatoes immediately after planting. This treatment provides control of pigweed, mustard Brassica spp., velvetleaf, goosegrass, foxtail and ragweed. The tomatoes produce an excellent yield.

EXAMPLE 11

Four kilograms of the active ingredient formulated as described in Example 9 are suspended in 400 liters of water and applied pre-emergence to one hectare of cotton. This treatment provides control of velvetlealf, teaweed, ragweed, goosegrass, and seedling Johnson grass, *Sorghum halepense*.

EXAMPLE 12

One and one-half kilograms of 4-bromo-3-methyl-5-[3-(o-fluorophenyl)ureido]isoxazole, as formulated in Example 9, and four kilograms of 1-(2-methylcyclohexyl)-3-phenylurea in the form of a wettable powder, are tank-mixed in 400 liters of water and applied pre-emergence to a hectare of snap beans. The treatment provides control of many broadleaved and grass weeds including ragweed, pigweed, foxtail, crabgrass, barnyardgrass, goosegrass, velvetleaf and mustard. The beans grow well and produce an excellent yield.

EXAMPLE 13

| | Percent |
|---|---|
| 4 - bromo - 3 - methyl-5-[3-o-fluorophenyl)ureido] isoxazole | 80 |
| Attapulgite clay | 16 |
| Finely-divided synthetic silica | 2 |
| Dioctyl sodium sulfosuccinate | 1 |
| Methylated cellulose | 1 |

The above ingredients are blended, micropulverized to a particle size below 50 microns, and reblended. Two kilograms of 4-chloro - 3 - methyl-5-[3-(o-fluorophenyl) ureido]isoxazole as formulated above, and five kilograms of dimethyl-2,3,5,6-tetrachloroterephthalate in the form of a wettable powder, are tank-mixed in 300 liters of water and sprayed pre-emergence on one hectare of direct seeded tomatoes. This treatment provides extended control of many grasses and broadleaved weeds including crabgrass, goosegrass, barnyardgrass, foxtail, ragweed, velvetleaf, teaweed, pigweed, mustard and yellow rocket, *Barbarea vulgaris*. The field provides an excellent yield of tomatoes.

EXAMPLE 14

| | Percent |
|---|---|
| 5-(3-phenylureido)-4-bromo-3-mehylisoxazole | 5 |
| Granular 10–5–5* commercial fertilizer about 16–30 U.S. mesh (0.59–1.19 mm.) | 94 |
| Nonylphenyl polyoxyethylene ethanol | 1 |

*Containing 10% nitrogen, 5% phosphorus as P₂O₅, and 5% potassium as K₂O.

The isoxazole and surfactant are dissolved in methanol and sprayed onto the fertilizer as it is agitated in a blender. The methanol is evaporated, leaving the treated fertilizer.

One hundred kilograms of this fertilizer is applied to one hectare of established blue grass turf which is infested with chickweed seed, *Stellaria media*. The application is made approximately one month before the seeds of chickweed are expected to germinate. The fertilizer encourages the growth of the blue grass while the isoxazole gives excellent control of chickweed.

I claim:

1. A method of controlling unwanted vegetation comprising applying to the locus of the vegetation an effective amount of an active compound having the formula in which $R_1$ is methyl or ethyl;
$R_2$ is hydrogen, chlorine, bromine or methyl;
$R_3$ is hydrogen or alkyl of 1 through 3 carbon atoms; and
$R_4$ is alkyl of 1 through 3 carbon atoms, unsubstituted cyclohexyl, cyclohexyl substituted with a substituent selected from the group consisting of chloro and methyl, or in which
X is hydrogen, fluorine, chlorine, bromine or methyl; and
Y is hydrogen, chlorine or NO₂;
with the limitation that when $R_4$ is aryl, $R_3$ must be hydrogen.

2. A method of claim 1 in which the $R_3$ substituent of the active compound is hydrogen, and the $R_4$ substituent is in which
X is halogen, fluorine, chlorine, bromine or methyl; and
Y is hydrogen, chlorine or NO₂.

3. A method of claim 2 in which the compound applied is 3-methyl-5-(3-phenylureido)isoxazole.
4. A method of claim 2 in which the compound applied is 4-bromo-3-methyl-5-(3-phenylureido)isoxazole.
5. A method of claim 2 in which the compound applied is 4-bromo-3-methyl-5-[3-(o-fluorophenyl)ureido] isoxazole.
6. A method of claim 2 in which the compound applied is 4-chloro-3-methyl-5-[3-(o-fluorophenyl)ureido] isoxazole.
7. A method of claim 2 in which the compound applied is 4-chloro-3-methyl-5-(3-phenylureido)isoxazole.
8. A method of claim 2 in which the active compound is applied pre-emergence.
9. A method of claim 2 in which the active compound is applied post-emergence.
10. An herbicidal composition comprising an inert carrier material and an active ingredient having the formula in which
$R_1$ is methyl or ethyl;
$R_2$ is hydrogen, chlorine, bromine or methyl;
$R_3$ is hydrogen or alkyl of 1 through 3 carbon atoms; and
$R_4$ is alkyl of 1 through 3 carbon atoms, unsubstituted cyclohexyl, cyclohexyl substituted with a substituent selected from the group consisting of chloro and methyl, or in which
X is hydrogen, fluorine, chlorine, bromine or methyl; and
Y is hydrogen, chlorine or NO₂;
with the limitation that when $R_4$ is aryl, $R_3$ must be hydrogen.

11. A composition of claim 10 in which the active ingredient is 3-methyl-5-(3-phenylureido)isoxazole.
12. A composition of claim 10 in which the active ingredient is 4 - bromo - 3 - methyl - 5 - (3 - phenylureido) isoxazole.

References Cited

UNITED STATES PATENTS

| 3,682,945 | 8/1972 | Engelhart | 71—90 |
| 3,155,678 | 11/1964 | Hatchard | 71—90 X |
| 3,454,591 | 7/1969 | Schulz et al. | 71—90 X |
| 3,560,517 | 2/1971 | Grabinger et al. | 71—88 |

JAMES O. THOMAS, JR., *Primary Examiner*